United States Patent

Place

[11] Patent Number: 5,934,405
[45] Date of Patent: Aug. 10, 1999

[54] POWER STEERING CONTROL VALVE

[75] Inventor: Jack L. Place, Greenville, Tenn.

[73] Assignee: TRW Inc., Lyndhurst, Ohio

[21] Appl. No.: 08/971,448

[22] Filed: Nov. 17, 1997

[51] Int. Cl.$^6$ ....................................................... B62D 5/08
[52] U.S. Cl. ................... 180/441; 91/375 A; 137/625.24
[58] Field of Search ..................................... 180/417, 421, 180/441; 91/375 A

[56] References Cited

U.S. PATENT DOCUMENTS

| | | | |
|---|---|---|---|
| 5,259,413 | 11/1993 | Harpole et al. | 137/625.24 |
| 5,357,845 | 10/1994 | Sangret | 91/375 A |
| 5,730,040 | 3/1998 | Strong | 91/375 A |
| 5,842,538 | 12/1998 | Sangret | 180/441 |

Primary Examiner—Robert Oberleitner
Assistant Examiner—Dan Yeagley
Attorney, Agent, or Firm—Tarolli, Sundheim, Covell, Tummino & Szabo

[57] ABSTRACT

A vehicle steering apparatus (10) includes a fluid motor (42) having first and second chambers (44, 46). A relatively rotatable, coaxial valve core (22) and valve sleeve (24) control the fluid pressure in the chambers (44, 46). The valve sleeve (24) has first and second recesses (72a, 74a) spaced around an axis (26) on opposite sides of a fluid inlet port (70a). The valve core (22) has a third recess (80a) which communicates the port (70a) with the first and second recesses (72a, 74a) when the valve core and valve sleeve (24) are in the neutral position. The valve core (22) has first and second axially extending lands (90a, 90b) on opposite sides of the third recess (80a) and land surfaces (92a, 92b) facing the first and second recesses (72a, 74a). The valve core (22) has a first passage (100a) for communicating with the first recess (72a) and a second passage (100b) for communicating with the second recess (74a) when in the neutral position. The first and second passages (100a and 100b) includes a first slot (130a) in the first land (90a) and a second slot (132b) in the second land (90b) terminating in a rectangularly shaped opening (134a) in the land surface and extending parallel to the axis (26).

12 Claims, 3 Drawing Sheets

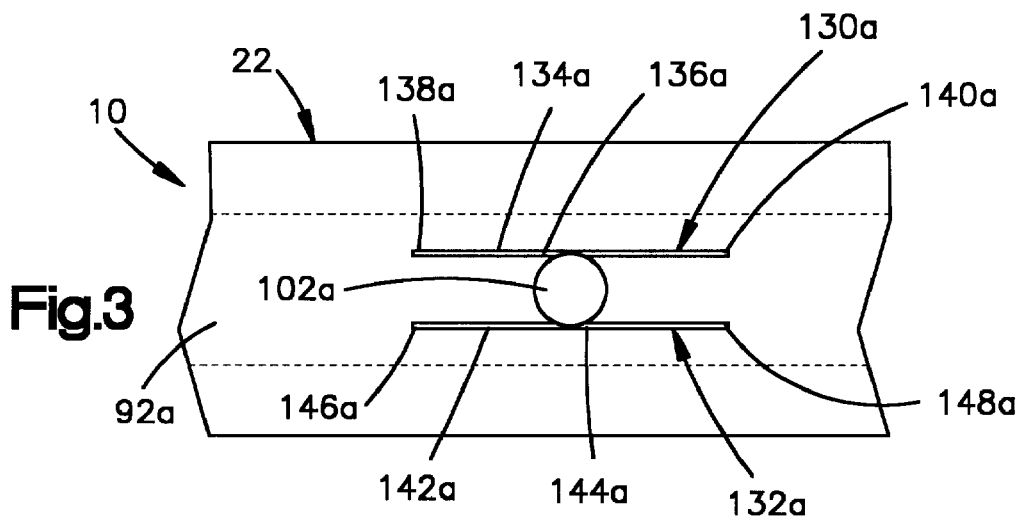
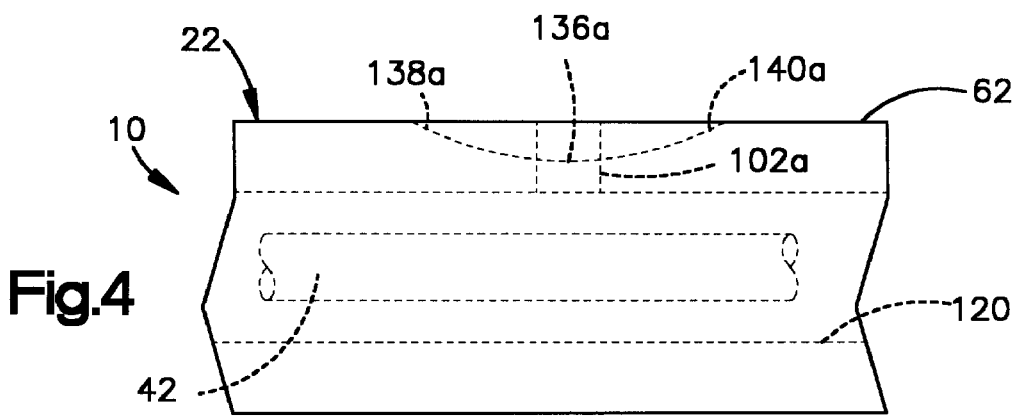

POWER STEERING CONTROL VALVE

BACKGROUND OF THE INVENTION

The present invention relates to a hydraulic rack and pinion power steering system including a control valve having an inner valve member (valve core) which is coaxial with and rotatable relative to an outer valve member (valve sleeve).

In this type of steering system, the inner valve member is formed on a part of a cylindrical input shaft which is connected for rotation with the vehicle steering wheel. The outer valve member is connected for rotation with a follow-up member in the form of a pinion. The pinion is in meshing engagement with the toothed portion of a rack. The rack is drivingly connected with a piston-cylinder type power steering motor and steerable vehicle wheels.

To effect actuation of the power steering motor to turn the steerable vehicle wheels, the inner valve member is rotated relative to the outer valve member, from a neutral condition. Relative rotation between the inner and outer valve members ports fluid under pressure to one side or the other of the steering motor to effect steering movement of the steerable vehicle wheels. It is desirable to provide laminar fluid flow and to minimize turbulent fluid flow in the control valve, because turbulence can cause undesirable noise in the steering system.

SUMMARY OF THE INVENTION

The present invention is a vehicle steering apparatus comprising a fluid motor having first and second chambers. Fluid pressure in the first chamber tends to turn vehicle wheels in one direction, and fluid pressure in the second chamber tends to turn vehicle wheels in a second direction opposite the first direction. The apparatus includes a valve core and a valve sleeve for controlling the fluid pressure in the first and second chambers. The valve sleeve encircles the valve core. The valve core and valve sleeve are coaxial and relatively rotatable about their axis. The valve sleeve has a port for connection to a fluid supply. The valve sleeve has a first recess spaced around the axis on one circumferential side of the port and connectable in fluid communication to the first chamber. The valve sleeve has a second recess on the other circumferential side of the port and connectable in fluid communication to the second chamber.

The valve core and valve sleeve have a neutral position in which the fluid pressure in the first and second chambers is equal. The valve core has a third recess which communicates the port with the first and second recesses when the valve core and valve sleeve are in the neutral position. Relative rotation of the valve core and valve sleeve in one direction about the axis from the neutral position causes rotation of the third recess relative to the first and second recesses. Such relative rotation of the third recess causes greater fluid communication between the third recess and the second recess and less fluid communication between the third recess and the first recess. The valve core has first and second axially extending lands on opposite sides of the third recess. The first and second lands have first and second land surfaces facing the first and second recesses.

The valve core has at least a pair of passages for communicating with return pressure. A first one of the pair of passages communicates with the first recess when the valve core and valve sleeve are in the neutral position. A second one of the pair of passages communicates with the second recess when the valve core and the valve sleeve are in the neutral position. The first passage includes a first slot in the first land. The first slot terminates in a rectangularly shaped opening in the first land surface communicating with the first recess and extending parallel to the axis. The second passage includes a second slot in the second land extending parallel to the axis and terminating in a rectangularly shaped opening in the second land surface communicating with the second recess. The first slot and the second slot each have a circumferential width sufficient to provide for laminar fluid flow through the first and second recesses to return.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein:

FIG. 3 is a schematic plan view of a portion of the control valve of FIG. 2; and FIG. 4 is a schematic side view of the control valve portion shown in FIG. 3.

DESCRIPTION OF A PREFERRED EMBODIMENTS

Figure 1:
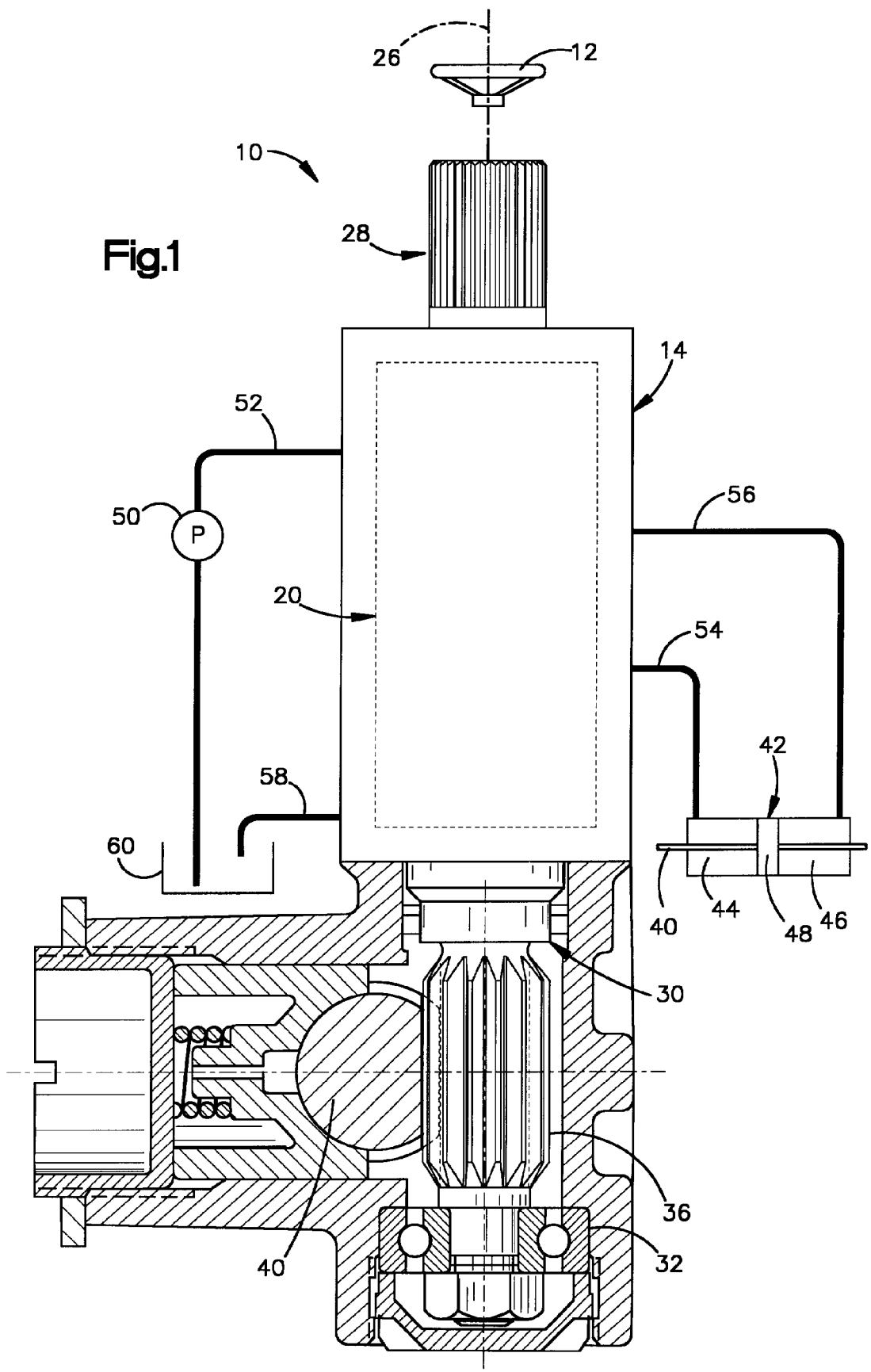
FIG. 1 is a schematic view partially in section of a vehicle power steering system including a control valve in accordance with the present invention.

The present invention relates to a hydraulic rack and pinion power steering system including a control valve having an inner valve member (valve core) which is coaxial with and rotatable relative to an outer valve member (valve sleeve). The present invention is applicable to various steering system constructions. As representative of the present invention, FIG. 1 illustrates a vehicle hydraulic power assist steering system 10. The power steering system 10 is operable to turn steerable vehicle wheels (not shown) upon rotation of a vehicle steering wheel 12 by an operator of the vehicle.

The steering system 10 includes a housing 14 which supports a control valve 20. The control valve 20 includes an inner rotary valve member or valve core 22 (FIG. 2), and an outer rotary valve member or valve sleeve 24. The outer valve member 24 encircles the inner valve member 22.

The valve core 22 (FIG. 2) has a cylindrical configuration including a cylindrical outer surface 62 centered on an axis 26. The valve sleeve 24 has a hollow cylindrical configuration with a cylindrical inner surface 64 centered on the axis 26. The inner valve member 22 and the outer valve member 24 are rotatable relative to each other and to the housing 14 about the common central axis 26 of the steering gear 10.

The inner valve member 22, described below in detail, is formed on a cylindrical input shaft member or valve stem 28 (FIG. 1) which is connected for rotation with the steering wheel 12. The outer valve member 24, also described below in detail, is connected for rotation with a follow-up member or pinion 30. The pinion 30 is rotatably supported in the housing 14 by a bearing 32. The pinion 30 has a pinion gear portion 36 which is in meshing engagement with the toothed portion of a rack 40. The inner valve member 22 and the outer valve member 24 are drivingly interconnected in a known manner through a resilient torsion bar 42a (FIG. 2) acting between the pinion 30 and the input shaft 28.

The rack 40 is drivingly connected with a power steering motor 42 and with the steerable wheels of the vehicle. The motor 42 has first and second cylinder chambers 44 and 46 on opposite sides of a piston 48 which is connected in the motor to the rack 40. Fluid pressure in the first chamber 44 tends to turn the steerable wheels of the vehicle in one direction and fluid pressure in the second chamber 46 tends to turn the steerable wheels of the vehicle in the opposite direction.

Hydraulic fluid for the steering system 10 is supplied to the control valve 20 by an engine driven pump 50 and a supply conduit 52. A pair of motor conduits 54 and 56 direct fluid between the control valve 20 and the motor chambers 44 and 46, respectively. A return conduit 58 directs fluid from the control valve 20 to a sump 60.

The control valve 20 (FIG. 2) includes three circumferentially spaced groups of ports and recesses 66a, 66b and 66c formed on the valve core 22 and the valve sleeve 24. The groups of ports and recesses 66a, 66b and 66c are identical to each other, and so only the one group 66a is described in detail. The groups of ports and recesses 66a, 66b and 66c, and the individual elements thereof, are similarly numbered, with the suffixes "a", "b", and "c" added to distinguish them.

The group 66a includes a fluid inlet port 70a which extends radially between the outer periphery of the valve sleeve 24 and the cylindrical inner surface 64 of the valve sleeve 24. The fluid inlet port 70a directs fluid from the supply conduit 52 to the interface between the inner surface 64 of the valve sleeve 24 and the outer surface 62 of the valve core 22.

First and second axially extending motor recesses 72a and 74a are formed on the inner surface 64 of the valve sleeve 24. The motor recesses 72a and 74a are spaced circumferentially about the axis 26 on opposite sides of the inlet port 70a. The motor recesses 72a and 74a are connected by outlet ports 76a and 78a, respectively, with the motor conduits 54 and 56 and, thereby, with the first and second fluid chambers 44 and 46 of the motor 42.

Figure 2:
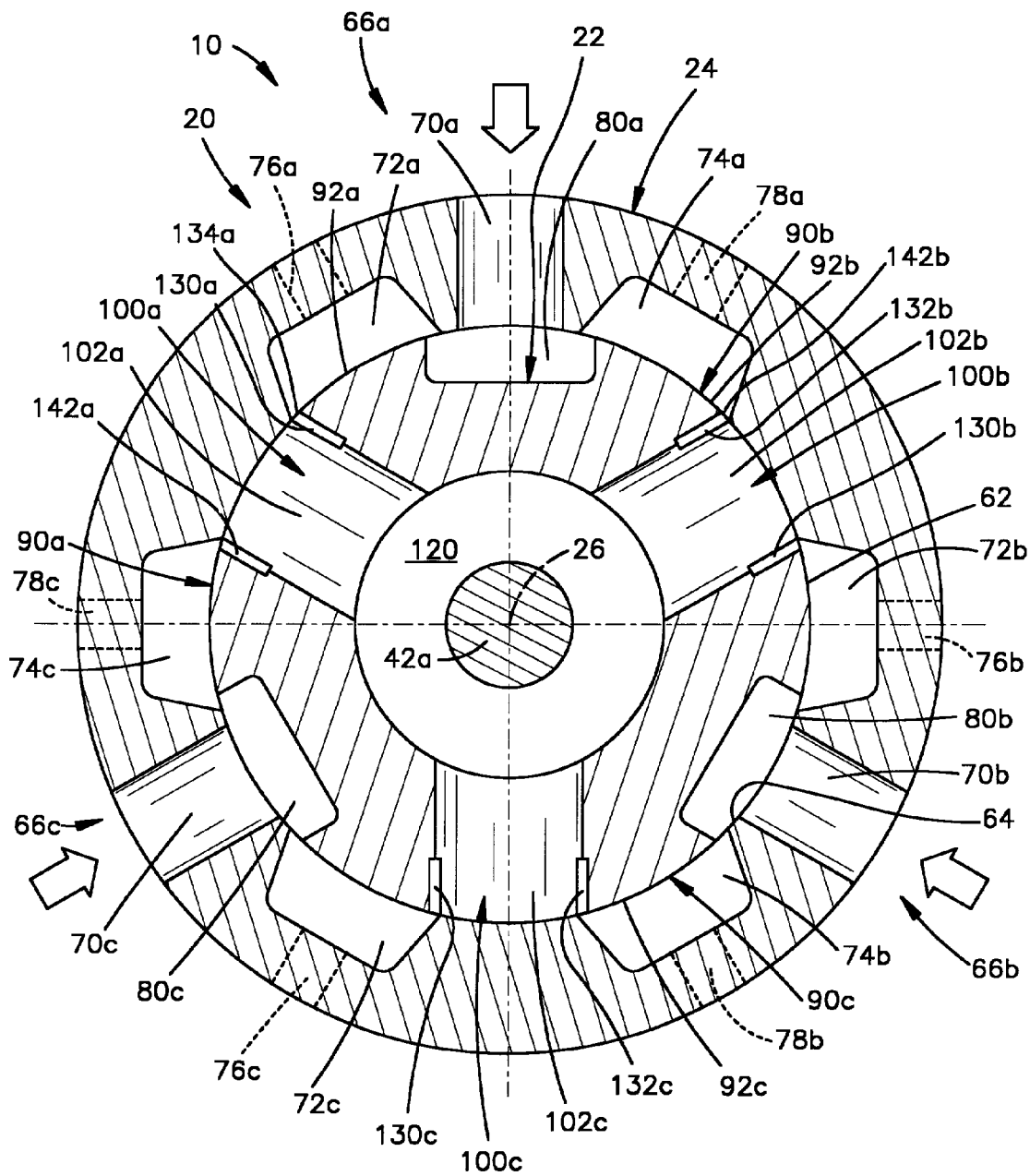
FIG. 2 is an enlarged sectional view of the control valve of the steering system of FIG. 1.

An axially extending third recess or control recess 80a is formed on the outer surface 62 of the valve core 22. The control recess 80a is located radially inward of the fluid inlet port 70a in the valve sleeve 24 when the valve 20 is in the neutral position. The control recess 80a is slightly wider, circumferentially, than the distance between the motor recesses 72a and 74a on the valve sleeve 24. Thus, the control recess 80a communicates the inlet port 70a with both of the motor recesses 72a and 74a when the valve core 22 and the valve sleeve 24 are in the neutral position as shown in FIG. 2. Relative rotation of the valve core 22 and the valve sleeve 24 causes greater fluid communication between the control recess 80a and one of the motor recesses 72a and 74a, and less fluid communication between the control recess 80a and the other one of the motor recesses 72a and 74a.

The valve core 22 includes three identical axially extending lands 90a, 90b and 90c. The first land 90a extends circumferentially between the control recesses 80c and 80a. The second land 90b extends circumferentially between the control recesses 80a and 80b. The first and second lands 90a and 90b are thus located on opposite sides of the control recess 80a. The third land 90c extends circumferentially between the control recesses 80b and 80c. The first and second lands 90a and 90b have first and second land surfaces 92a and 92b, respectively, facing the first and second motor recesses 72a and 74a, respectively. The third land 90c has a third land surface 92c facing radially outward.

The valve core 22 has three identical return passages 100a, 100b and 100c for communicating with the sump 60.

The first return passage 100a is formed in the first land 90a. The first return passage 100a includes a radially extending first circular opening 102a and communicates with the first motor recess 72a when the valve core 22 and the valve sleeve 24 are in the neutral position.

The second return passage 100b is formed in the second land 90b. The second return passage 100a includes a second circular opening 102b and communicates with the second motor recess 74a when the valve core 22 and the valve sleeve 24 are in the neutral position. The third return passage 100c is formed in the third land 90c and includes a third circular opening 102c. The circular openings 102a–102c all communicate with a central, axial return channel 120 in the valve core 22. The return channel 120 communicates with the return conduit 58.

Each one of the three return passages 100a–100c includes a pair of axially extending slots, described below in detail, on the outer surface 62 of the valve core 22. The first return passage 100a includes a pair of slots 130a and 132a. The second return passage 100b includes a pair of slots 130b and 132b. The third return passage 100c includes a pair of slots 130c and 132c. Because the three pairs of slots 130a–130c and 132a–132c are identical to each other, only the slots 130a and 132a, forming part of the return passage 100a, are described in detail.

The slot 130a (FIGS. 3 and 4) has a rectangular configuration terminating in an elongate, rectangularly shaped opening 134a in the first land surface 92a. The opening 134a extends parallel to the axis 26. The slot 130a has a central portion 136a and axially opposite end portions 138a and 140a.

The slot 130a extends tangentially to the first circular opening 102a. The central portion 136a of the slot 130a intersects the circular opening 102a. The slot 130a is located circumferentially, or angularly about the axis 26, so that the circumferential center of the opening 134a is about at the outer diameter of the circular opening 102a.

The radial depth of the slot 130a varies along the length of the slot. The slot 130a is deepest at its central portion 136a, as seen in FIG. 4, with a maximum depth equal to about half the depth (radial length) of the circular opening 102a. The depth of the slot 130a tapers to zero at the axial end portions 138a and 140a of the slot. The slot 130a has a length about equal to the length of the motor recess 72a in the valve sleeve 24.

The third slot 142a in the passage 100a is identical in configuration to the slot 130a. The slot 132a has a rectangular configuration terminating in an axially elongate, rectangularly shaped opening 142a in the first land surface 92a. The slot 132a has a central portion 144a and axially opposite end portions 146a and 148a.

The central portion of the slot 132a intersects the circular opening 102a. The slot 132a extends tangentially to the first circular opening 102a. The slot 132a is located circumferentially, or angularly about the axis 26, so that the circumferential center of the opening 142a is about at the outer diameter of the circular opening 102a. The slot 132a is deepest at its central portion 144a and tapers to zero depth at its axial end portions 146a and 148a.

The second return passage 100b (FIG. 2) includes two slots 130b and 132b. The slot 130b in the second return passage 100b is identical in configuration and orientation to the slot 130a in the first return passage 100a. The slot 130b has a rectangular configuration terminating in an axially elongate, rectangularly shaped opening in the second land surface 92b. The slot 132b in the second return passage 100b is identical in configuration and orientation to the slot 132a in the first return passage 100a. The slot 132b has a rectangular configuration terminating in an axially elongate, rectangularly shaped opening 142b in the second land surface 92b.

The third return passage 100c also includes two slots 130c and 132c. The slot 130c is identical in configuration and orientation to the slot 130a in the first return passage 100a. The slot 130c has a rectangular configuration terminating in an axially elongate, rectangularly shaped opening in the third land surface 92c. The other slot 132c in the third return passage 100c is identical in configuration and orientation to the slot 132a in the first return passage 100a. The slot 132c has a rectangular configuration terminating in an axially elongate, rectangularly shaped opening in the third land surface 92c.

When the control valve 20 is in the neutral position, the control recess 80a is centered circumferentially between the first and second motor recesses 72a and 74a. The fluid pressure in the first and second motor chambers 44 and 46 is equal. The slot 130a in the return passage 100a communicates with the first motor recess 72a, along substantially its entire length. The slot 132b in the return passage 100b communicates with the second motor recess 74a, along substantially its entire length.

The general operation of the steering system 10 is well known and, therefore, is described herein only briefly. Relative rotation between the valve core 22 and the valve sleeve 24 directs fluid under pressure from the fluid inlet port 70a, through the control recess 80a in the valve core 22, to one or the other of the motor recesses 72a and 74a in the valve sleeve 24, for example, the motor recess 72a. The fluid flows from the motor recess 72a through the motor port 76a and the motor conduit 54 to the first motor chamber 44. The piston 48 moves in a direction to the right as viewed in FIG. 1, effecting linear movement of the rack 40 and steering movement of the steerable wheels of the vehicle.

Low pressure fluid is, simultaneously, exhausted from the second motor chamber 46. This return fluid flows into the control valve 20 through the motor conduit 56, the motor port 78a, and the second motor recess 74a. The return fluid then flows through the slot 132b and the circular opening 102b into the first return passage 100b in the second land 90b in the valve core 22. The return fluid then flows into the central return passage 120 in the valve core 22 and thence is directed through the return conduit 58 to the sump 60.

Each one of the slots 130a–130c and 132a–132c communicates with its associated motor recess along substantially its entire length. The slots 130a–130c and 132a–132c have a circumferential width (i.e. a width measured circumferentially around the valve core 22) sufficient to provide for laminar fluid flow through the motor recesses 72a–72c and 74a–74c to return. The slots 130a–130c provide also sufficient flow capacity to limit pressure drop while the valve 20 is in the neutral position. At the same time, the slots 130a–130c and 132a–132c are sufficiently narrow to quench cavitation and thus minimize turbulence and resulting noise.

In one embodiment, the valve core 22 has a diameter of about 0.75 inches (three-quarters of an inch). The circular openings 102a–102c in the return passages 100a–100c have a diameter of about 0.187 inches (three-sixteenths of an inch). Each one of the slots 130a–130c and 132a–132c has a circumferential width of about 0.5 mm (one-half millimeter) and a length of about 19–20 millimeters.

From the above description of the invention, those skilled in the art will perceive improvements, changes and modifications in the invention. Such improvements, changes and modifications within the skill of the art are intended to be covered by the appended claims.

Having described the invention, I claim:

1. A vehicle steering apparatus comprising:

a fluid motor having first and second chambers, fluid pressure in said first chamber tending to turn steerable vehicle wheels in first direction and fluid pressure in said second chamber tending to turn the steerable vehicle wheels in a second direction opposite said first direction;

a valve core and a valve sleeve for controlling the fluid pressure in said first and second chambers, said valve sleeve encircling said valve core, said valve core and valve sleeve being coaxial and relatively rotatable about an axis;

said valve sleeve having a port for connection to a fluid supply, said valve sleeve having a first recess spaced around said axis on one circumferential side of said port and connectable in fluid communication to said first chamber, said valve sleeve having a second recess on the other circumferential side of said port and connectable in fluid communication to said second chamber;

said valve core and valve sleeve having a neutral position in which the fluid pressure in said first and second chambers is equal, said valve core having a third recess which communicates said port with said first and second recesses when said valve core and valve sleeve are in the neutral position;

relative rotation of said valve core and valve sleeve in one direction about said axis from the neutral position causing rotation of said third recess relative to said first and second recesses causing greater fluid communication between said third recess and said second recess and less fluid communication between said third recess and said first recess;

said valve core having first and second axially extending lands on opposite sides of said third recess, said first and second lands having first and second land surfaces facing said first and second recesses;

said valve core having at least a pair of passages for communicating with return channel, a first one of said pair of passages communicating with said first recess when said valve core and valve sleeve are in the neutral position, a second one of said pair of passages communicating with said second recess when valve core and said valve sleeve are in the neutral position;

said first passage including a first slot in said first land, said first slot terminating in a rectangularly shaped opening in said first land surface communicating with said first recess and extending parallel to said axis;

said second passage including a second slot in said second land extending parallel to said axis and terminating in a rectangularly shaped opening in said second land surface communicating with said second recess;

said first slot and said second slot each having a circumferential width sufficient to provide for laminar fluid flow through said first and second recesses to return.

2. A vehicle steering apparatus as set forth in claim 1 wherein said first passage includes a radially extending first circular opening which communicates said first slot with return and said second passage includes a radially extending second circular opening which communicates said second slot with return.

3. A vehicle steering apparatus as defined in claim 1 wherein each one of said first and second slots has a circumferential width of about 0.5 millimeters.

4. A vehicle steering apparatus as defined in claim 3 wherein each one of said first and second slots has a length of about 19 to 20 millimeters.

5. A vehicle steering apparatus as defined in claim 1 wherein said first passage includes a third slot identical in configuration to said first slot and a radially extending circular opening centered circumferentially between said first and third slots, said second passage including a fourth slot identical in configuration to said second slot and a radially extending circular opening centered circumferentially between said second and fourth slots.

6. A vehicle steering apparatus as defined in claim 5 wherein each one of said slots has a circumferential width of about 0.5 millimeters and each one of said circular openings has a diameter of about 5 millimeters.

7. A vehicle steering apparatus as defined in claim 1 wherein each one of said first and second slots has a central portion and first and second opposite axial end portions, the depth of said slots being greatest at said central portions and tapering to zero depth at said slot end portions.

8. A vehicle steering apparatus comprising:

a fluid motor having first and second chambers, fluid pressure in said first chamber tending to turn steerable vehicle wheels in first direction and fluid pressure in said second chamber tending to turn the steerable vehicle wheels in a second direction opposite said first direction;

a valve core and a valve sleeve for controlling the fluid pressure in said first and second chambers, said valve sleeve encircling said valve core, said valve core and valve sleeve being coaxial and relatively rotatable about an axis;

said valve sleeve having a port for connection to a fluid supply, said valve sleeve having a first recess spaced around said axis on one circumferential side of said port and connectable in fluid communication to said first chamber, said valve sleeve having a second recess on the other circumferential side of said port and connectable in fluid communication to said second chamber;

said valve core and valve sleeve having a neutral position in which the fluid pressure in said first and second chambers is equal, said valve core having a third recess which communicates said port with said first and second recesses when said valve core and said valve sleeve are in their neutral position;

relative rotation of said valve core and valve sleeve in one direction about said axis from the neutral position causing rotation of said third recess relative to said first and second recesses causing greater fluid communication between said third recess and said second recess and less fluid communication between said third recess and said first recess;

said valve core having first and second axially extending lands on opposite sides of said third recess, said first and second lands having first and second land surfaces facing said first and second recesses;

said valve core having an axial passage communicating with return channel, said valve core also having a pair of passages including a first passage communicating said axial passage with said first recess when said valve core and valve sleeve are in the neutral position and a second passage communicating said axial passage with said second recess when said valve core and valve sleeve are in the neutral position;

said first passage including a first slot in said first land, said first slot terminating in a rectangularly shaped opening in said first land surface communicating with said first recess, said first slot extending tangentially to a first circular opening extending through said first land and communicating with said axial passage in said valve core;

said second passage including a second slot in said second land terminating in a rectangularly shaped opening in said second land surface communicating with said second recess, said second slot extending tangentially to a second circular opening extending through said second land and communicating with said axial passage in said valve core.

9. A vehicle steering apparatus as defined in claim 8 wherein each one of said first and second slots has a circumferential width of about 0.5 millimeters.

10. A vehicle steering apparatus as defined in claim 9 wherein each one of said first and second slots has a length of about 19 to 20 millimeters.

11. A vehicle steering apparatus as defined in claim 8 wherein each one of said first and second slots has a central portion and first and second opposite axial end portions, the depth of said slots being greatest at said central portions and tapering to zero depth at said slot end portions.

12. A vehicle steering apparatus as set forth in claim 8 wherein each one of said rectangularly shaped openings has an axial length about equal to the length of its associated recess and a circumferential width of about 0.5 millimeters.

* * * * *